United States Patent
Oki et al.

(10) Patent No.: US 8,425,984 B2
(45) Date of Patent: Apr. 23, 2013

(54) MULTILAYER FILM AND MANUFACTURING METHOD THEREOF

(75) Inventors: Kazuhiro Oki, Minami-Ashigara (JP); Kazuhiro Shiojiri, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 12/918,123

(22) PCT Filed: Feb. 18, 2009

(86) PCT No.: PCT/JP2009/052741
§ 371 (c)(1),
(2), (4) Date: Aug. 18, 2010

(87) PCT Pub. No.: WO2009/104629
PCT Pub. Date: Aug. 27, 2009

(65) Prior Publication Data
US 2010/0315715 A1 Dec. 16, 2010

(30) Foreign Application Priority Data
Feb. 19, 2008 (JP) .................. 2008-037029

(51) Int. Cl.
*B05D 3/02* (2006.01)
(52) U.S. Cl.
USPC .................. 427/384; 427/385.5
(58) Field of Classification Search .................. None
See application file for complete search history.

(56) References Cited

U.S. PATENT DOCUMENTS

| | | | |
|---|---|---|---|
| 5,387,463 A | 2/1995 | Nakamura et al. | |
| 2004/0161543 A1* | 8/2004 | Nojo et al. | 427/385.5 |
| 2006/0105155 A1 | 5/2006 | Ikeyama et al. | |
| 2008/0038467 A1* | 2/2008 | Jagannathan et al. | 427/256 |

FOREIGN PATENT DOCUMENTS

| | | |
|---|---|---|
| JP | 6-3501 A | 1/1994 |
| JP | 6-18706 A | 1/1994 |
| JP | 7-333403 A | 12/1995 |
| JP | 2004-243172 A | 9/2004 |
| JP | 2005-195820 A | 7/2005 |
| JP | 2006-106290 A | 4/2006 |
| JP | 2006-169510 A | 6/2006 |
| JP | 2007-237483 A | 9/2007 |

OTHER PUBLICATIONS

Abstracts and partial machine translation of JP2006-106290, Apr. 2006.*
International Search Report, dated Jun. 2, 2009, issued in corresponding international application PCT/JP2009/052741.
International Preliminary Report on Patentability (Chapter I) dated Sep. 2, 2010.
Chinese Office Action issued Jul. 11, 2012 in corresponding Chinese Application No. 200980105590.1 with English translation.
Japanese Office Action dated Dec. 3, 2012, for JP Application No. 2008-037029, with English translation.

* cited by examiner

*Primary Examiner* — Erma Cameron
(74) *Attorney, Agent, or Firm* — Birch Stewart Kolasch & Birch, LLP

(57) ABSTRACT

According to a manufacturing method of a multilayer film according to one aspect of the present invention, at the step of applying a coating liquid prepared by dissolving a plurality of monomers or polymers in at least one solvent onto a substrate and subsequently drying the coating liquid, the solvent is allowed to penetrate into the substrate at a specified speed. This causes concentration distribution of the solvent within the coated layer in the thickness direction thereof, and thus a multilayer film separated into an upper layer and a lower layer can be formed by one coating. Accordingly, a multilayer film having a different function in each layer can be formed by one coating.

5 Claims, 6 Drawing Sheets

MULTILAYER FILM AND MANUFACTURING METHOD THEREOF

CROSS-REFERENCE TO RELATED APPLICATIONS

The present application is a national phase under 35 U.S.C. §371 of PCT International Application No. PCT/JP2009/052741 which has an International filing date of Feb. 18, 2009, which claims priority to Application No. 2008-037029 filed in Japan on Feb. 19, 2008 under 35 U.S.C. §119, the entire contents of which are hereby incorporated by reference.

TECHNICAL FIELD

The present invention relates to a multilayer film and a manufacturing method thereof, and particularly relates to a method for forming a multilayer film by applying a polymer solution onto a flat substrate or a continuously conveyed sheet made of a plastic, a metal, or the like and drying the polymer solution thereon.

BACKGROUND ART

Technical development to support larger-sized screens, higher quality of images, higher precision, lower power consumption, and the like has been demanded in enlargement and rapid development of the market for flat panel displays such as liquid crystal displays, plasma displays, and organic electroluminescence displays.

As one of members for advanced features of such a flat panel display, an anti-glare film and an antireflection film that are attached onto the surface of the display, for example, and scatter light reflected on a screen to improve visibility are used.

Various products have been proposed as such an anti-glare film and an antireflection film. For example, Patent Document 1 has proposed an anti-glare film in which an anti-glare layer containing resin beads is formed on a transparent substrate. Patent document 2 has proposed a porous optical material having a refractive index lower than that of a transparent material by dispersing fine pores in the transparent material.

Patent document 3 has disclosed a method for forming a porous film by which in a method for forming an antireflection film, a film is formed by holding a substrate facing a target at an early stage of sputtering film formation, and gradually inclining the substrate to the target in proportion to a film forming time.

Patent document 4 has proposed a method for manufacturing an anti-glare film in which phase separation by spinodal decomposition is used to form an anti-glare layer containing polymer domains within a matrix resin.

Patent Document 1: Japanese Patent Application Laid-Open No. 06-18706
Patent Document 2: Japanese Patent Application Laid-Open No. 06-3501
Patent Document 3: Japanese Patent Application Laid-Open No. 07-333403
Patent Document 4: Japanese Patent Application Laid-Open No. 2005-195820

DISCLOSURE OF THE INVENTION

Problems to be Solved by the Invention

However, each of the methods in the above-mentioned Patent Documents has difficulty in stable manufacturing, and may increase material cost or manufacturing cost. Specifically, in the case of dispersing particles as in the above-mentioned Patent Document 1, there exists a problem that performance is not stabilized by fluctuation in particle size distribution of the particles or aggregation thereof. Moreover, in a method for forming the domain in the resin matrix as in Patent Document 4, there is a problem that a domain size is likely to vary in a thickness direction.

Particularly in the above-mentioned Patent Document 4, it is necessary to perform coating several times to form a multilayer in order to form a domain having a desired size. This not only leads to an increase in manufacturing cost, but also an increase in the final coating thickness. For this reason, manifestation of a desired function may be impossible.

The present invention has been made in consideration of such circumstances. An object of the present invention is to provide a multilayer film and a manufacturing method thereof that can form a multilayer film by one coating, and easily form domains having a different function in each of the layers formed.

Means for Solving the Problems

In order to achieve the object, a first aspect according to the present invention is a manufacturing method of a multilayer film comprising the steps of: applying a monolayer of a coating liquid onto a substrate, the coating liquid being prepared by dissolving a plurality of monomers or polymers in at least one solvent; and drying the coated layer; and provides a manufacturing method of a multilayer film in which at the step of drying the coated layer, the coated layer is separated into an upper layer and a lower layer each having a different composition by allowing the at least one solvent to penetrate into the substrate at a specified speed.

According to the first aspect, at the step of applying the coating liquid prepared by dissolving the plurality of monomers or polymers in the at least one solvent onto the substrate and subsequently drying the coating liquid, the solvent is allowed to penetrate into the substrate at the specified speed. This causes concentration distribution of the solvent within the coated layer in the thickness direction thereof, so that the multilayer film separated into an upper layer and a lower layer can be formed by one coating. Accordingly, the multilayer film having a different function in each layer can be formed by one coating.

A second aspect according to the present invention is the method according to the first aspect further comprising the step of designing a combination of a kind of the solvent and a kind of the substrate so that the solvent penetrates into the substrate at the specified speed as a previous step of the step of applying the coating liquid.

The speed at which the solvent penetrates into the substrate varies with a combination of a kind of the solvent and a kind of the substrate. According to the second aspect, the solvent can be allowed to penetrate into the substrate at the specified speed because the step of designing a combination of a kind of the solvent and a kind of the substrate is performed as the previous step of the step of applying the coating liquid.

A third aspect according to the present invention is the method according to the first or second aspect in which the multilayer film has (drying speed of the solvent)/(permeation speed of the solvent into the substrate)>1 at the step of drying.

According to the third aspect, deformation of the substrate caused by excessive permeation of the solvent or the like can be suppressed because the drying speed is made larger than the permeation speed.

A fourth aspect according to the present invention is the method according to one of the first to third aspects in which the drying speed of the solvent is from 0.03 to 5 $g/m^2/s$.

A constant drying time is necessary for formation of the multilayer film. At an excessively slow drying speed, the solvent may excessively penetrate to cause deformation of the substrate or the like. On the other hand, at an excessively fast drying speed, a phase structure having a sufficient size may not be formed, or deterioration of surface state quality due to uneven drying and the like may occur. According to the fourth aspect, separation into the upper layer and the lower layer is allowed without causing such a defect.

A fifth aspect according to the present invention is the method according to one of the first to fourth aspects in which the coating liquid contains another solvent whose permeation speed into the substrate is not more than ½ of that of the solvent.

According to the fifth aspect, concentration gradient of the solvent can be increased in the thickness direction of the coated layer because the another solvent whose permeation speed into the substrate is not more than ½ of that of the permeating solvent is contained. This can accelerate permeation of the solvent having high permeability into the substrate.

A sixth aspect according to the present invention is the method according to one of the first to fifth aspects in which the at least two kinds of a plurality of monomers or polymers are not compatible with each other.

According to the sixth aspect, phase separation accompanied by drying can be easily produced because the at least two kinds of monomers or polymers are not compatible with each other.

A seventh aspect according to the present invention is the method according to one of the first to sixth aspects in which a ratio of the drying speed to the permeation speed is adjusted so that in a composition ratio of the upper layer and that of the lower layer, concentrations thereof change toward the first polymer side and to the second polymer side respectively through a critical point on a triangular phase diagram composed of the solvent, the first polymer, and the second polymer.

In the triangular phase diagram, through the critical point, the first polymer side forms a first polymer-rich phase and the second polymer side forms a second polymer-rich phase. Then, a droplet structure is formed from a bicontinuous phase by an effect of surface tension. For this reason, according to the seventh aspect, the composition ratio of the upper layer and that of the lower layer are shifted so as to cross the critical point. Thereby, the upper layer and the lower layer having an inverted composition ratio of a sea-island structure can be formed.

In order to achieve the object, an eighth aspect according to the present invention provides a multilayer film manufactured by the method according to one of the first to seventh aspects.

Such a multilayer film can be used as optical functional film sheets such as antireflection films, anti-glare films, polarizing plates, and optical compensation films, functional films including a heat sensitive developing agent, nano particles, and the like, separator films for fuel cells, magnetic recording tapes, adhesive tapes, and barrier films, for example.

A ninth aspect according to the present invention is the multilayer film according to the eighth aspect in which at least a first polymer layer and a second polymer layer are formed on the substrate, the first polymer layer is formed by dispersing domains of the second polymer in a matrix of the first polymer, and the second polymer layer is formed by dispersing domains of the first polymer in a matrix of the second polymer.

According to the ninth aspect, a multilayer film composed of the first polymer layer having the domains of the second polymer dispersed in the matrix of the first polymer and the second polymer layer having the domains of the first polymer dispersed in the matrix of the second polymer can be formed by one coating. Accordingly, it is not necessary to perform coating several times as in the conventional method, and a multilayer film having a different function in each layer can be produced efficiently.

A tenth aspect according to the present invention is a multilayer film according to the eighth or ninth aspect in which the multilayer film is an antireflection film in which refractive indexes of the respective layers are different from each other.

According to the tenth aspect, optical interference layers each having a different refractive index can be formed by one coating.

Advantage of the Invention

According to the present invention, a multilayer film can be formed by one coating, and domains having a different function in each of the layers formed can be produced easily.

DESCRIPTION OF SYMBOLS

Figure 1:
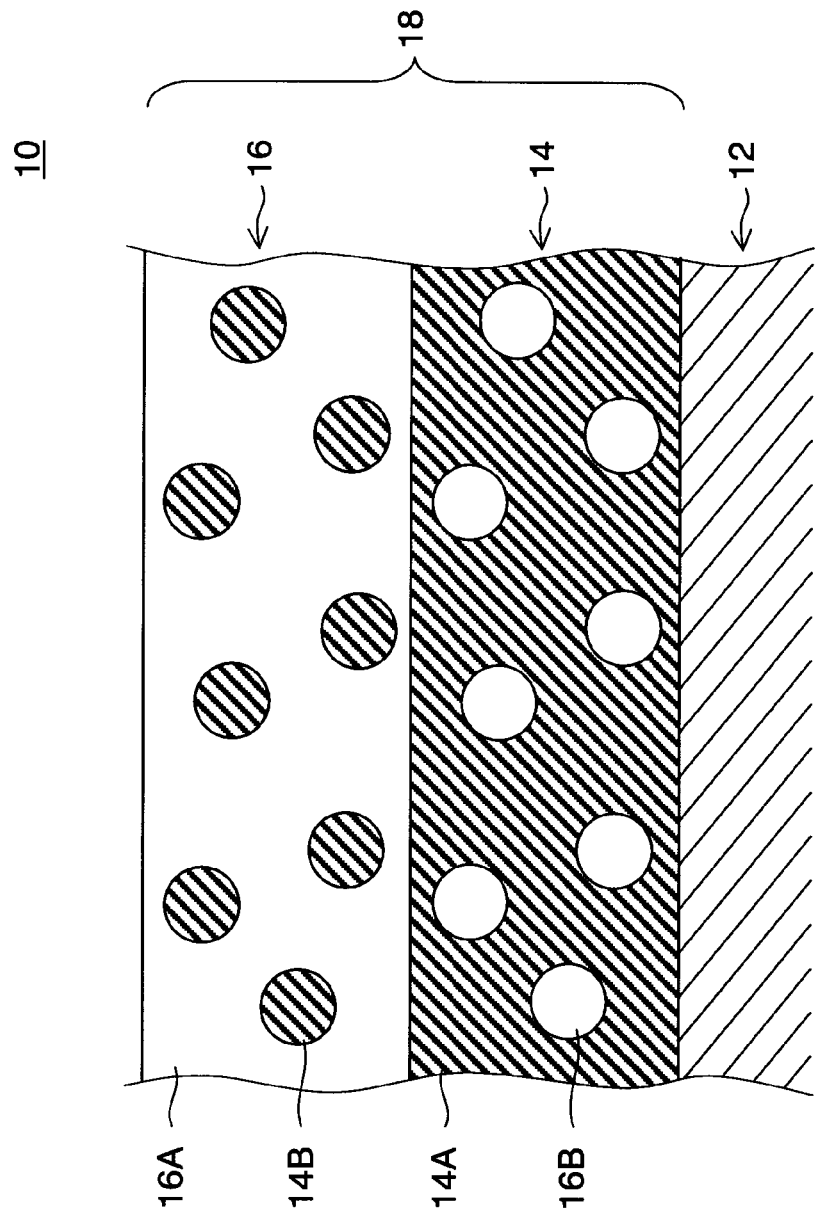
FIG. 1 is a schematic cross-sectional view showing an example of an antireflection film in the present embodiment.

10 . . . Antireflection film
12 . . . Transparent substrate
14 . . . First polymer layer
14A . . . Matrix of the first polymer
14B . . . Domains of the first polymer
16 . . . Second polymer layer
16A . . . Matrix of the second polymer
16B . . . Domains of the second polymer
18 . . . Multilayer film
40 . . . Manufacturing step of the antireflection film
50 . . . Coater
50A . . . Coating head
54 . . . (Initial) drying zone
56 . . . Heating (main drying) zone

BEST MODE FOR CARRYING OUT THE INVENTION

Hereinafter, a preferable embodiment of a manufacturing method of a multilayer film according to the present invention will be described in accordance with the accompanying drawings.

First, in the present embodiment, a structure of an antireflection film will be described as an example of the multilayer film. Needless to say, the multilayer film can be used as not only the antireflection film but also functional films including a heat sensitive developing agent, nano particles, and the like, and various films such as separator films for fuel cells.

FIG. 1 is a schematic cross-sectional view showing an example of the antireflection film in the present embodiment. As shown in FIG. 1, the antireflection film 10 is obtained by forming a multilayer film 18 in which a first polymer layer 14 mainly containing a first polymer and a second polymer layer 16 mainly containing a second polymer are laminated on a transparent substrate 12. In the present embodiment, an example in which two kinds of polymers are used to form a two-layered film structure will be described. However, needless to say, a multilayer film having not less than three layers can also be formed using not less than three kinds of polymers (or monomers).

The transparent substrate 12 may be any transparent material into which a solvent used at the time of forming the first and second polymer layers penetrates. A light transmittance of the transparent substrate is preferably not less than 80%, and more preferably not less than 86%. A haze of the transparent substrate is preferably not more than 2.0%, and more preferably not more than 1.0%. A refractive index of the transparent substrate is preferably from 1.4 to 1.7. Moreover, a plastic film is preferably used. Examples of a material for the plastic film include cellulose esters, polyamides, polycarbonates, polyesters (e.g., polyethyleneterephthalate, polyethylenenaphthalate, and the like), polystyrenes, polyolefines, polysulfones, polyethersulfones, polyarylates, polyetherimides, polymethylmethacrylates, and polyether ketones.

The first polymer layer 14 has a sea-island structure in which domains 16B of the second polymer are dispersed in a matrix 14A of the first polymer.

The second polymer layer 16 has a sea-island structure in which domains 14B of the first polymer are dispersed in a matrix 16A of the second polymer.

A shape of the domains 14B and 16B is not limited in particular, and is circular, elliptical, or the like, for example. An average particle size of the domains 14B and 16B is from 2 to 100 μm, for example, and preferably from 5 to 50 μm.

Preferably, the average particle size of the domain 14B is smaller than that of the domain 16B in order to make the refractive index on an air interface side larger than that on the transparent substrate 12 side to improve antireflection. The average particle sizes of the domain 14B and the domain 16B are preferably from 50 nm to 20 μm, for example.

A volume ratio of matrix 14A/domain 14B and that of matrix 16A/domain 16B can be approximately 90/10 to 30/70, for example. Moreover, the domains 14B and 16B may be dispersed not only inside of the matrix but also on the surface of the matrix. Thereby, a projection and depression structure or a wavy structure can be formed on the surface of the matrix. In the case where the domains 14B and 16B are partially projected on the surface of the matrix, an average height of the projected portion is preferably from 0.1 to 5 μm, for example.

A thickness of the multilayer film 18 is from 1 to 500 μm, for example, and preferably approximately from 5 to 200 μm.

As the antireflection film 10, a thin film such as a hard-coat layer, an antistatic layer, and the like (for example, a conductive thin film made of a light curable resin containing a conducting agent or a hydrophilic component) may be formed when necessary.

Next, various materials used to form the multilayer film 18 will be described.

The polymer used for the present embodiment (the first and second polymers) is not limited in particular. Usually, a thermoplastic resin is used. Examples of the thermoplastic resin can include styrenic resins, (meth)acrylic resins, organic acid vinylester based resins, vinyl ether based resins, halogen containing resins, olefin based resins (including alicyclic olefin based resins), polycarbonate based resins, polyester based resins, polyamide based resins, thermoplastic polyurethanes, polysulfone based resins (polyether sulfones, polysulfones, and the like), polyphenylene ether based resins (polymers of 2,6-xylenol, and the like), cellulose derivatives (cellulose esters, cellulose carbamates, cellulose ethers, and the like), silicone resins (polydimethylsiloxanes, polymethylphenylsiloxanes, and the like), rubbers and elastomers (diene based rubbers such as polybutadiene and polyisoprene, styrene-butadiene copolymers, acrylonitrile-butadiene copolymers, acrylic rubbers, urethane rubbers, silicone rubbers, and the like). Not less than two kinds of these thermoplastic resins can be used in combination.

As the (meth)acrylic resins, a (meth)acrylic monomer alone or a copolymer thereof can be used, or a copolymer of a (meth)acrylic monomer and a copolymerizable monomer can be used, for example. Examples of the (meth)acrylic monomer can include (meth)acrylic acids; C1-10 alkyl(meth)acrylates such as methyl(meth)acrylates, ethyl(meth)acrylates, butyl(meth)acrylates, t-butyl(meth)acrylates, isobutyl (meth)acrylates, hexyl(meth)acrylates, octyl(meth)acrylates, 2-ethylhexyl (meth)acrylates; aryl(meth)acrylates such as phenyl(meth)acrylates; hydroxyalkyl (meth)acrylates such as hydroxyethyl(meth)acrylates and hydroxypropyl (meth)acrylates; glycidyl(meth)acrylates; N,N-dialkylaminoalkyl (meth)acrylates; (meth)acrylonitriles; (meth)acrylates having an alicyclic hydrocarbon group such as tricyclodecane. Examples of the copolymerizable monomer can include the styrenic monomers, vinyl ester based monomers, maleic acid anhydrides, maleic acid, and fumaric acid. These monomers can be used alone, or not less than two kinds thereof can be used in combination.

Examples of the (meth)acrylic resins include poly(meth)acrylic acid esters such as polymethyl methacrylates, methyl methacrylate-(meth)acrylate copolymers, methyl methacrylate-(meth)acrylic acid ester copolymers, methyl methacrylate-acrylic acid ester-(meth)acrylate copolymers, and (meth)acrylic acid ester-styrene copolymers (e.g., MS resins). Preferable examples of the (meth)acrylic resins include C1-6 alkyl poly(meth)acrylates such as polymethyl(meth)acrylates, and particularly methyl methacrylate based resins mainly containing methyl methacrylate (50 to 100% by weight, and preferably approximately 70 to 100% by weight).

Of the cellulose derivatives, examples of cellulose esters can include aliphatic organic acid esters (e.g., cellulose acetates such as cellulose diacetate and cellulose triacetate; and C1-6 organic acid esters such as cellulose propionate, cellulose butyrate, cellulose acetate propionate, and cellulose acetate butylate), aromatic organic acid esters (C7-12 aromatic carboxylate esters such as cellulose phthalate and cellulose benzoate), and inorganic acid esters (e.g., cellulose phosphate, cellulose sulfate). Mixed acid esters such as acetic acid-nitric acid cellulose esters may also be used. Examples of the cellulose derivatives also include cellulose carbamates (e.g., cellulose phenyl carbamate), and cellulose ethers (e.g., cyanoethyl cellulose; hydroxy C2-4 alkyl celluloses such as hydroxyethyl cellulose and hydroxypropyl cellulose; C1-6 alkyl celluloses such as methyl cellulose and ethyl cellulose; carboxymethyl cellulose and salts thereof, benzyl cellulose, and acetyl alkyl cellulose).

As a preferable thermoplastic resin, a resin that is non-crystalline and can be dissolved in an organic solvent (a common solvent that particularly can dissolve a plurality of polymers and curable compounds) is usually used. Resins having high moldability or film forming properties, transparency, and weatherability such as styrenic resins, (meth)acrylic resins, alicyclic olefin based resins, polyester based resins, cellulose derivatives (e.g., cellulose esters) are particularly preferable. Particularly, cellulose derivatives are preferable as the thermoplastic resin. The cellulose derivatives are a semi-synthetic polymer, and have a dissolution behavior different from other resins and curing agents. Accordingly, the cellulose derivatives have very good phase separation properties.

Moreover, from a viewpoint of abrasion resistance after curing, for example, a polymer having a functional group that is involved in a curing reaction (a functional group that can be reacted with a curing agent) can also be used as one polymer of the polymers not compatible with each other. Examples of such a functional group include condensation and reactive functional groups (e.g., a hydroxyl group, an acid anhydride group, a carboxyl group, an amino group, an imino group, an epoxy group, a glycidyl group, an isocyanate group), polymerizable functional groups (e.g., C2-6 alkenyl groups such as vinyl, propenyl, isopropenyl, butenyl, and allyl; C2-6 alkynyl groups such as ethynyl, propynyl, and butynyl; C2-6 alkenylidene groups such as vinylidene; and functional groups having these polymerizable functional groups (e.g., a (meth)acrylyl group).

In the present embodiment, preferably, a mass ratio of the first polymer and the second polymer is approximately 1:3 to 1:10 in the case where the first polymer is a cellulose derivative (e.g., cellulose esters such as cellulose acetate propionate) and the second polymer is an acrylic resin, for example. Instead of a plurality of polymers, a plurality of monomers may be used, or a polymer and a monomer can also be used in combination. For example, specific examples of a material for an acrylate monomer include pentaerythritol triacrylate and dipentaerythritol hexaacrylate.

A curable compound that can be used is various curable compounds that are compounds having a functional group that reacts with a heat ray, an active energy line (e.g., ultraviolet rays, electron beams) or the like, and that can be cured or crosslinked with heat, an active energy line, or the like to form a resin (particularly, a curing or crosslinking resin).

Examples of the curable compound include thermosetting compounds and resins [low molecular weight compounds having an epoxy group, an isocyanate group, an alkoxy silyl group, a silanol group, polymerizable groups (e.g., a vinyl group, an allyl group, a (meth)acrylyl group) (and prepolymers, e.g., low molecular weight resins such as epoxy based resins, unsaturated polyester based resins, urethane based resins, and silicone based resin)]; and light curable compounds that can be cured with an active ray (e.g., ultraviolet rays) (ultraviolet ray curable compounds such as light curable monomers, oligomers, and prepolymers). The light curable compound may be EB (electron beam) curable compounds. The light curable compounds, such as light curable resins that may be the light curable monomers, oligomers, and low molecular weight resins, may be simply referred to as a "light curable resin." The curable compounds can be used alone, or not less than two kinds thereof can be used in combination.

The light curable compound usually has a light curable group, for example, a polymerizable group (e.g., a vinyl group, an allyl group, a (meth)acrylyl group) or a photosensitive group (e.g., a cinnamoyl group), and the light curable compounds having a polymerizable group (for example, monomers, oligomers (or resins, and particularly low molecular weight resins)) are particularly preferable.

Of the light curable compounds having a polymerizable group, examples of the monomer include monofunctional monomers [(meth)acrylic monomers such as (meth)acrylic acid esters, for example, alkyl(meth)acrylates (C1-6 alkyl (meth)acrylates such as methyl(meth)acrylate), cycloalkyl (meth)acrylates, (meth)acrylates having a crosslinked cyclic hydrocarbon group (e.g., isobornyl(meth)acrylate, adamanthyl(meth)acrylate), and glycidyl(meth)acrylates; and vinyl esters such as vinyl acetate, and vinyl based monomers such as vinyl pyrrolidone], and polyfunctional monomers having at least two polymerizable unsaturated bonds [alkylene glycol di(meth)acrylates such as ethylene glycol di(meth)acrylate, propylene glycol di(meth)acrylate, butanediol di(meth) acrylate, neopentyl glycol di(meth)acrylate, and hexanediol di(meth)acrylate; (poly)oxyalkylene glycol di(meth)acrylates such as diethylene glycol di(meth)acrylate, dipropylene glycol di(meth)acrylate, and polyoxy tetramethylene glycol di(meth)acrylate; di(meth)acrylates having a crosslinked cyclic hydrocarbon group such as tricyclodecane dimethanol di(meth)acrylate and adamantane di(meth)acrylate; polyfunctional monomers having approximately 3 to 6 polymerizable unsaturated bonds such as trimethylolpropane tri (meth)acrylate, trimethylolethane tri(meth)acrylate, pentaerythritol tri(meth)acrylate, pentaerythritol tetra(meth) acrylate, and dipentaerythritol penta(meth)acrylate].

The curable compound may be used in combination with a curing agent according to the kind of the curable compound. For example, the light curable compound can be used in combination with a photopolymerization initiator.

Examples of the photopolymerization initiator that can be used include acetophenones, propiophenones, benzyls, benzoins, benzophenones, thioxanthones, and acyl phosphine oxide. The content of the photopolymerization initiator can be approximately 0.1 to 20 parts by weight based on the curable compound.

The phase separation property of the plurality of polymers can be determined simply by visually checking whether a residual solid content becomes cloudy in the course in which a homogeneous solution is prepared by using a good solvent for the components of both of the polymers and the good solvent is gradually vaporized. In the case where more precise measurement of the phase separation property of the plurality of polymers is desired, a method for accurately measuring the concentration in which phase separation occurs from a change point of an output corresponding to a change in the concentration (e.g., permeability, absorption coefficient) by using a spectrophotometer or a turbidity meter can be used. Whether phase separation occurs can also be examined also with a light scattering method.

The above-mentioned solvent may be any solvent that dissolves at least two kinds of the plurality of polymers and penetrates into the transparent substrate 12. Namely, the solvent can be properly selected according to kinds of the transparent substrate 12, the polymer, polymerizable components, and the like. As such a solvent, in the case of a mixed solvent, at least one kind thereof may be any solvent that can uniformly dissolve the solid content (the plurality of polymers, the curable compound, the reaction initiator, and other additives). Examples thereof include ketones (e.g., acetone, methyl ethyl ketone, methyl isobutyl ketone, cyclohexanone); ethers (e.g., dioxane, tetrahydrofuran); aliphatic hydrocarbons (e.g., hexane); alicyclic hydrocarbons (e.g., cyclohexane); aromatic hydrocarbons (e.g., toluene, xylenes); halocarbons (e.g., dichloromethane, dichloroethane); esters (e.g., methyl acetate, ethyl acetate, butyl acetate); water; alcohols (e.g., ethanol, isopropanol, butanol, cyclohexanol); cellosolves (e.g., methyl cellosolve, ethylcellosolve); cellosolve acetates; sulfoxides (e.g., dimethyl sulfoxide); and amides (dimethyl formamide, dimethyl acetamide). These solvents can be used alone, or not less than two kinds thereof can be in combination.

A mixed solvent prepared by mixing a solvent having a very low permeation speed into the transparent substrate (a solvent having a low permeability) with the above-mentioned solvent may be used. Depending on a combination with the transparent substrate, examples of such a solvent having a low permeability include a solvent having a permeation speed into the transparent substrate of not more than ½ of that of the above-mentioned solvent, and for example, butanol and tetrahydrofuran in the case where TAC is used for the transparent substrate.

In order to control concentration distribution by the solvent precisely, for the transparent substrate 12, a material into which only a solvent that dissolves the first and second polymers penetrates and no other component penetrates is preferable among the materials already mentioned. The transparent substrate 12 also includes those having other functional layer formed on the surface thereof in advance.

The above-mentioned multilayer film structure can be formed in the following manner. Namely, the multilayer film structure is formed as follows: a solution prepared by dissolving a plurality of the polymers (or monomers) not compatible with each other in a common solvent is applied onto the transparent substrate 12, and subsequently is dried. This step of drying is accompanied by (a) an effect to form concentration distribution in the thickness direction of a coated layer by allowing at least one solvent (the solvent having a high permeability) in the applied solution to penetrate into the transparent substrate 12 at a specified speed, and produce phase separation into an upper layer and a lower layer; and (b) an effect to form a sea-island (droplet phase) structure having domains by producing phase separation (nucleus formation or spinodal decomposition) accompanied by drying (a sea-island structure of an independent phase having a spherical shape, a true spherical shape, a discotic shape, or an elliptical shape). Namely, there is one case where the sea-island structure grows according to nucleus formation or a growth mechanism with progression of phase separation, and there is another case where a bicontinuous structure is formed by spinodal decomposition and the sea-island (droplet phase) structure is formed by progression of subsequent phase separation.

In the above-mentioned method, a heat-polymerizable or photopolymerizable component (particularly, a polyfunctional curing monomer and/or an oligomer) may be used to form a multilayer film, and subsequently may be polymerized by irradiation with an active energy line (e.g., ultraviolet rays, electron beams) or heating to be cured.

Figure 2:
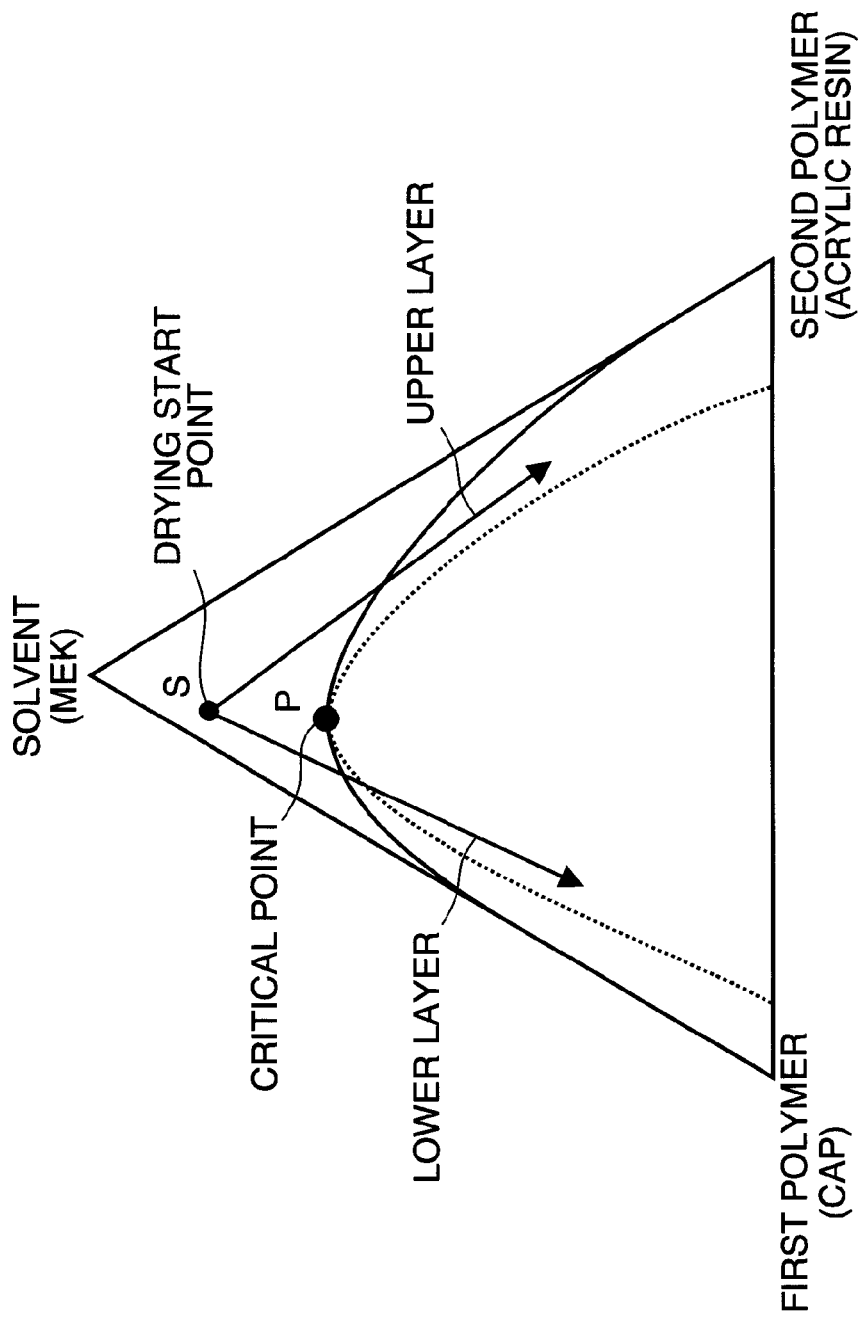
FIG. 2 is a triangular phase diagram illustrating an example of phase separation of a solution in the present embodiment.

FIG. 2 shows an example of a triangular phase diagram illustrating phase separation of a solution containing the first and second polymers not compatible with each other and a solvent that dissolves these polymers. This is a case where the first polymer is cellulose acylate propionate (CAP) and the second polymer is an acrylic resin.

In the drawing, a curve of a solid line shows a binodal line, and is a boundary line for production of phase separation. A curve of a dotted line designates a spinodal line.

Phase separation is produced in a region within the binodal line. A region surrounded by the binodal line and the spinodal line is called a metastable region, and phase separation progresses by nucleus formation or a growth mechanism. A region within the spinodal line is an unstable region, and phase separation by spinodal decomposition is produced. A point at which the binodal line and the spinodal line coincide is a critical point P.

As shown in FIG. 2, in (a) and (b) mentioned above, the concentrations are changed so that the composition ratios of the upper layer and the lower layer obtained by phase separation from a drying start point S of the solution may cross the critical point P on the triangular phase diagram in separate directions (on the first polymer side and on the second polymer side). Thereby, for example, in the lower layer, the sea-island (droplet phase) structure of the second polymer is formed by nucleus formation, a growth mechanism, or spinodal decomposition in the matrix mainly containing the first polymer, while in the upper layer, the sea-island (droplet phase) structure of the first polymer is formed in the matrix mainly containing the second polymer. Thus, a multilayer film having a uniform sea-island structure in which the composition ratio of the upper layer and that of the lower layer are inverted as shown in FIG. 1 can be obtained.

Such a spinodal line, binodal line, critical point, and the like can be determined on the basis of a literature ("Scaling Concepts in Polymer Physics," pp. 94-96, CORNELL UNIVERSITY PRESS), for example.

The above-mentioned control is performed by controlling a ratio of the speed (permeation speed) at which at least one solvent (the solvent having a high permeability) included in the solution penetrates into the transparent substrate and a speed (drying speed) at which the solvent vaporizes from the solution. Namely, phase separation is produced by causing concentration distribution of the above-mentioned solvent in the thickness direction of the coated layer of the solution.

Specifically, the above-mentioned ratio is preferably within the range where (drying speed of the solvent)/(permeation speed of the solvent into the transparent substrate)>1 is satisfied, and more preferably within the range where (drying speed of the solvent)/(permeation speed of the solvent into the transparent substrate)>2 is satisfied.

The permeation speed of the solvent into the transparent substrate can be adjusted by a combination of the transparent substrate and the solvent, and the content of the solvent in the solution, and the content of the solute, for example. For example, in the case where the content of the solvent in the solution is increased, concentration gradient of the solvent is larger in the thickness direction of the coated layer so that the permeation speed of the solvent can be increased.

A preferable combination of the transparent substrate and the solvent is a combination in which the solvent penetrates easily, specifically a combination in which the permeation speed of the solvent is larger than the drying speed of the solvent. The permeation speed of the solvent can also be adjusted by adding another solvent that hardly penetrates into the transparent substrate. In this case, the permeation speed can be increased because the concentration gradient in the thickness direction of the coated layer is increased.

Figure 3:
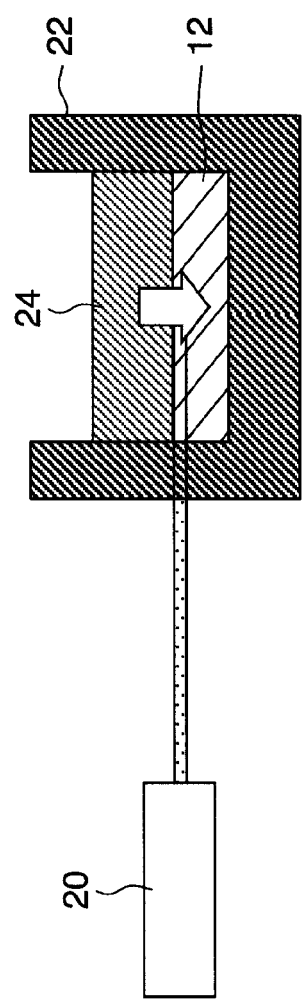
FIG. 3 is an explanatory view showing a micro Raman measuring apparatus for measuring a permeation speed of a solvent in the present embodiment.

The permeation speed can be measured with a micro Raman measuring apparatus 20 as shown in FIG. 3, for example. Namely, as shown in the drawing, the transparent substrate 12 and a solvent 24 are charged into a glass cell 22. Then, time change of the amount of the solvent permeating into the transparent substrate 12 is measured using the micro Raman measuring apparatus 20 in a cross-sectional direction (from the side of the drawing). As the micro Raman measuring apparatus 20, the one made by in Via Reflex (Renishaw plc) can be used, for example.

The drying speed of the solvent can be adjusted by a speed of drying air, a drying temperature, and the like. The drying speed is preferably from 0.03 to 5 $g/m^2/s$. At an excessively slow drying speed, the solvent may excessively penetrate, causing deformation of the transparent substrate or the like. Conversely, at an excessively fast drying speed, a phase structure having a sufficient size may not be formed or deterioration of quality of the surface state due to uneven drying, or the like may occur.

Figure 4:
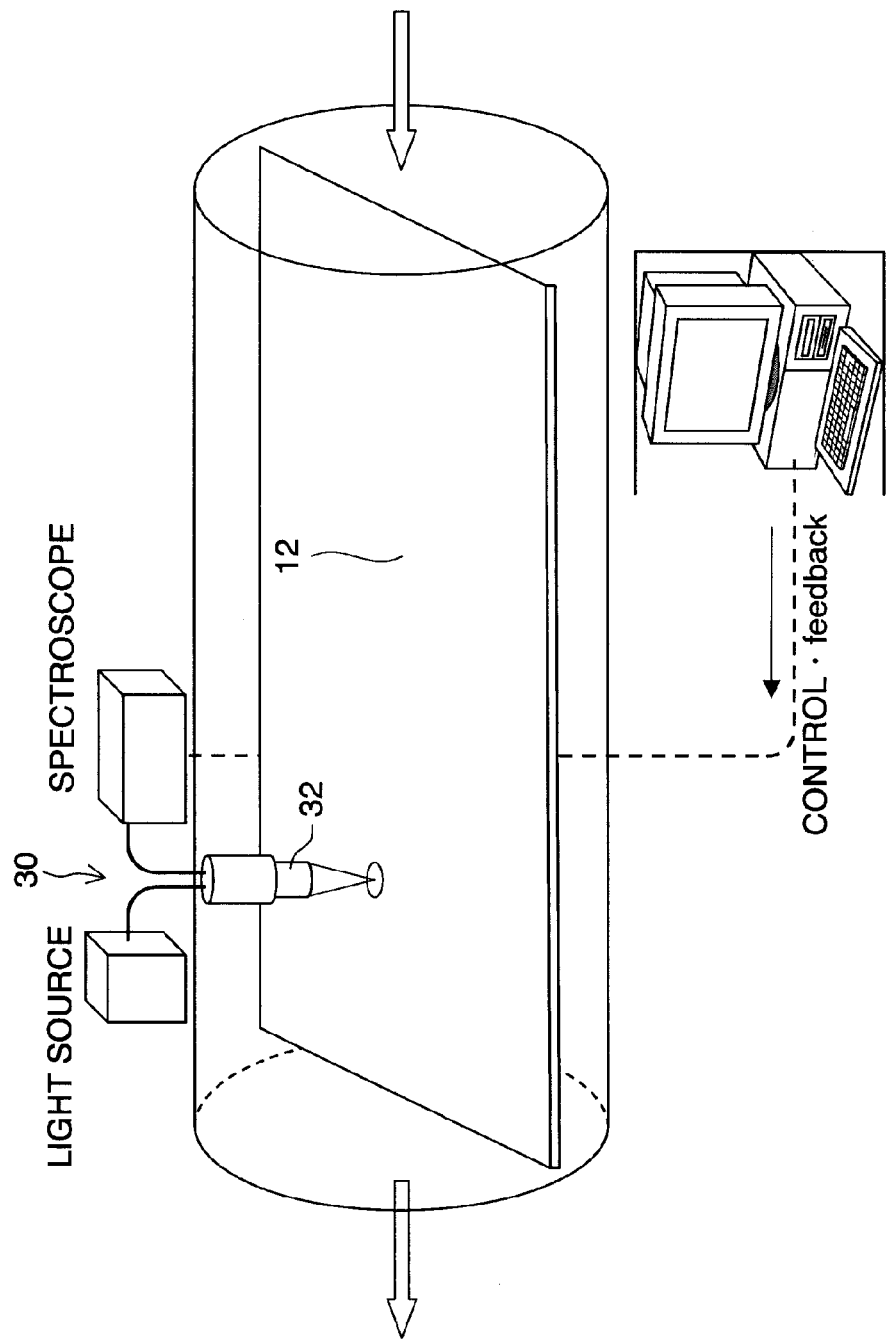
FIG. 4 is an explanatory view showing an FTIR apparatus for measuring a drying speed of the solvent in the present embodiment.
Figure 5:
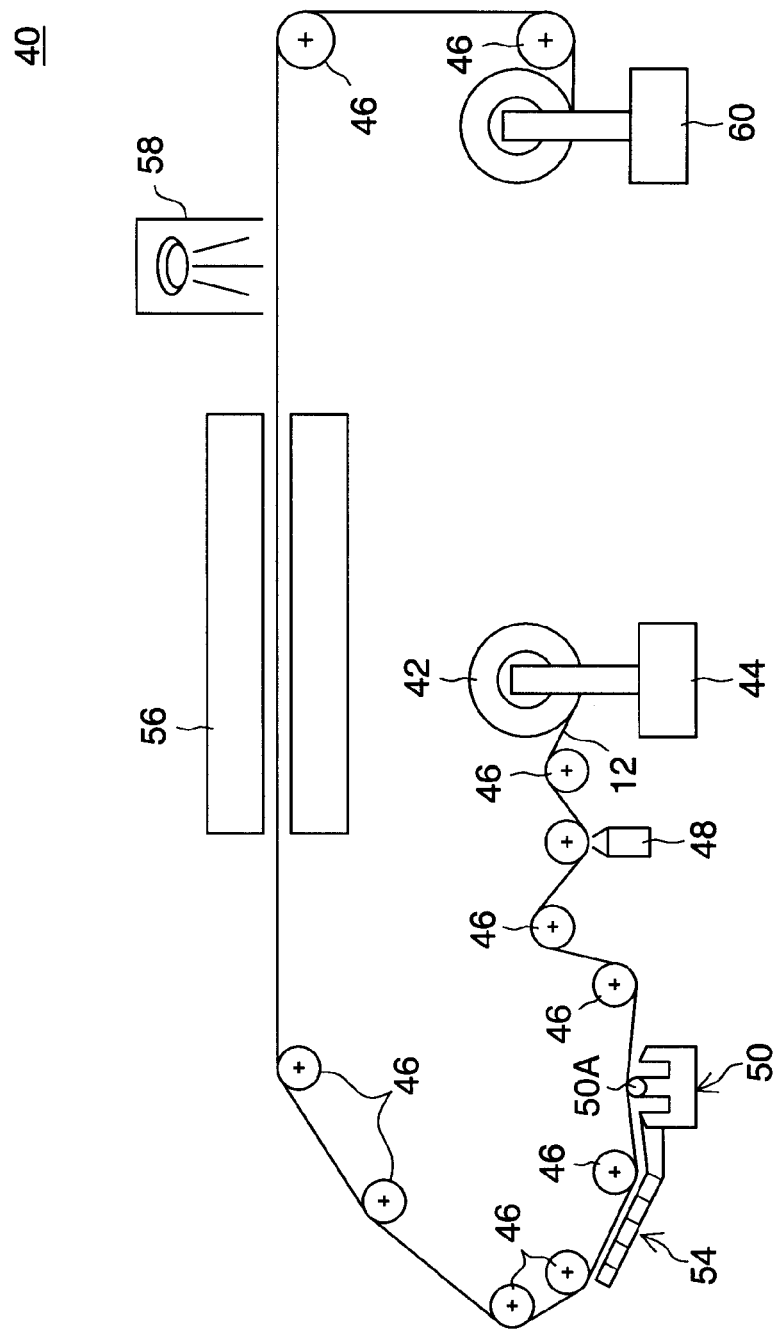
FIG. 5 is a schematic view showing an example of a manufacturing step of an antireflection film in the present embodiment.

The drying speed can be measured with a portable FTIR apparatus 30 as shown in FIG. 4, for example. Namely, as shown in the drawing, using the portable FTIR apparatus 30 having a fiber in a sensor unit 32, time change of the solvent in the coated layer to be vaporized accompanied by drying is examined from change in absorbance from above the coated layer of the transparent substrate 12 that travels in an arrow direction. As such an FTIR apparatus, VIR-9500 (Jasco Corporation) can be used, for example.

Next, a manufacturing method of an antireflection film including a multilayer film structure in the present embodiment will be described. Description will be made using an example in which two kinds of the polymers not compatible with each other, a solvent that dissolves these polymers, and a solution containing a curable compound are used as the coating liquid for an antireflection layer.

FIG. 1 is a schematic view showing an example of a manufacturing step 40 of an antireflection film according to the present embodiment.

A long transparent substrate 12 (including those having a certain functional layer already formed) is fed from a film roll 42 by a feeder 44. The traveling speed of the transparent substrate 12 can be 0.1 to 1.5 m/s, for example.

The transparent substrate 12 is guided by a guide roller 46, and is fed to a dust remover 48. The dust remover 48 can remove dust adhering to the surface of the transparent substrate 12. A coating head 50A of an extrusion type coater 50 as application means is provided downstream of the dust remover 48 so that a coating liquid for an antireflection layer can be applied successively or simultaneously onto the transparent substrate 12 wound around a backup roller. A coated layer can have a wet thickness of not more than 40 μm, for example.

As a coating method, a dip coating method, an air knife coating method, a curtain coating method, a slide coating method, a roller coating method, a wire bar coating method, a gravure coating, a micro gravure method, and the like can be used. The coating head 50A may be installed in a pure atmosphere such as a clean room. At that time, cleanliness is preferably not more than class 1000, more preferably not more than class 100, and still more preferably not more than class 10.

An (initial) drying zone 54 that produces phase separation in the present embodiment and a heating (main drying) zone 56 are sequentially provided downstream of the coating head 50A. Preferably, in the (initial) drying zone 54, the solvent is vaporized under suppression while the surface of the formed coated layer is sealed with a gaseous layer to vaporize most of the solvent. Subsequently, the coated layer is further dried in the heating (main drying) zone 56.

Phase separation mentioned above is produced in this drying zone 54 by vaporizing the solvent from the coated layer of the coating liquid for an anti-glare layer at a predetermined temperature (for example, room temperature of 25° C.) and permeating the solvent into the transparent substrate 12.

A drying speed is preferably 0.03 to 5.0 g/m$^2$/s because an excessively fast drying speed causes the coating liquid to be dried and solidified before phase separation is produced. As for the drying temperature, drying may be performed at a temperature of approximately 40 to 120° C. according to the boiling point of the solvent, for example. The amount of the drying air can be approximately 1 to 20 m/min., for example.

As for sealing of the gaseous layer on the surface of the coating layer in the drying zone 54, the gas is preferably moved along the surface of the coated layer so as to have a relative speed of −0.1 to 0.1 m/s with respect to the traveling speed of the coated layer. In order to vaporize the solvent under suppression, drying is preferably performed within a period of time when the decreasing speed of the solvent content in the coated layer is proportional to time. As for drying, a cover is preferably attached. For the drying air, adjusted air or uniform air may be used. Alternatively, the vaporized solvent may be condensed with a cooling condensation plate provided facing the coated layer to be removed.

The heating (main drying) zone 56 is not limited in particular, and a hot air heating apparatus (for example, a thermal treatment apparatus described in Japanese Patent Application Laid-Open No. 2001-314799), a heater heating apparatus, and the like can be used. In the case where hot air heating is performed, the air speed of the hot air is preferably not more than 1 m/s in order to suppress heating unevenness.

Downstream of the drying step, as a step of curing the coated layer, the coated layer is cured or crosslinked by a heat ray or an active energy line (e.g., ultraviolet rays, electron beams). A curing method can be selected according to a kind of the curable compound. For example, an ultraviolet ray irradiating apparatus 58 is used. Desired curing or crosslinking can be formed by this ultraviolet ray irradiation.

A heat treating zone for curing with heat may be provided depending on a material to perform desired curing or crosslinking. Moreover, after the transparent substrate 12 having the formed coated layer is taken up, oven heating or heat treatment by conveying the transparent substrate 12 may be performed at a separated step. Then, the transparent substrate 12 having the antireflection film formed is taken up by a winder 60 provided downstream thereof.

In the case where the coating liquid is successively applied onto the transparent substrate 12 to form a coated layer having two or more layers. It is preferable for production that these be continuously performed (without taking up the transparent substrate 12, the coating and drying steps are repeated, and eventually the transparent substrate 12 is taken up).

As described above, by using the multilayer film and manufacturing method according to the present invention, a multilayer film having different functions (refractive index change for a difference in the composition, and the like) on the transparent substrate can be easily formed by one coating. Thereby, an antireflection film provided with light interference layers each having a different refractive index can be manufactured with good productive efficiency.

In the present embodiment, description has been made using an example in which a two-layered film structure is formed using the solution prepared by dissolving two kinds of the polymers in the solvent. However, a multilayer film having not less than three layers can also be formed using a solution prepared by dissolving not less than three kinds of polymers (or monomers) in a solvent.

In a preferable embodiment of the antireflection film described below, the multilayer film according to the present invention can form an arbitrary combination of an anti-glare layer, a low refractive index layer, a middle refractive index layer, and a high refractive index layer.

Namely, an antireflection layer composed of a monolayer to several layers of light interference layers on the transparent substrate is provided on the topmost surface of the antireflection film, and a hard-coat layer and an anti-glare layer are provided between the transparent substrate and the light interference layer when necessary. Of the multilayer films having the above-mentioned combination, the one including both the anti-glare layer and the antireflection layer is called an anti-glare antireflection film.

The anti-glare antireflection film having a layer structure in which an anti-glare layer and a low refractive index layer are laminated on the transparent substrate is designed so as to have a refractive index that satisfies below. Anti-glare layer>refractive index of low refractive index layer. A hard-coat layer may also be provided between the transparent substrate and the anti-glare layer. A haze of the antireflection film preferably has a haze suitable for the anti-glare layer. Moreover, strength of the film is preferably not less than H in a pencil hardness test in accordance with JIS K5400, and more preferably not less than 2H, and most preferably not less than 3H.

A clear type antireflection film having a layer structure in which a hard-coat layer is provided on the transparent substrate and a low refractive index layer is laminated is designed so as to have a refractive index that satisfies below. Refractive index of anti-glare layer>refractive index of low refractive index layer. The hard-coat layer may also be provided between the transparent substrate and the anti-glare layer. A haze of the antireflection film is preferably not more than 5%, and more preferably not more than 3%. Moreover, strength of the film is preferably not less than H in a pencil hardness test in accordance with JIS K5400, and more preferably not less than 2H, and most preferably not less than 3H.

Alternatively, an anti-glare antireflection film having a layer structure in which an anti-glare layer is provided on the transparent substrate and a high refractive index layer and a low refractive index layer are laminated is designed so as to have a refractive index that satisfies below. Refractive index of high refractive index layer>refractive index of transparent substrate>refractive index of low refractive index layer. A haze of the antireflection film preferably has a haze suitable for the anti-glare layer. Moreover, strength of the film is preferably not less than H in a pencil hardness test in accordance with JIS K5400, and more preferably not less than 2H, and most preferably not less than 3H.

Alternatively, an anti-glare antireflection film having a layer structure in which a hard-coat layer is provided on the transparent substrate and a high refractive index layer and a low refractive index layer are laminated is designed so as to have a refractive index that satisfies below. Refractive index of high refractive index layer>refractive index of transparent substrate>refractive index of low refractive index layer. A haze of the antireflection film is preferably not more than 5%, and more preferably not more than 3%. Moreover, strength of the film is preferably not less than H in a pencil hardness test in accordance with JIS K5400, and more preferably not less than 2H, and most preferably not less than 3H.

[High Refractive Index Layer and Middle Refractive Index Layer]

The refractive index of the high refractive index layer is usually from 1.70 to 2.20. The thickness of the high refractive index layer is preferably from 5 nm to 10 μm, and more preferably from 10 nm to 1 μm. The refractive index of the middle refractive index layer is adjusted so as to be a value between the refractive index of the low refractive index layer and the refractive index of the high refractive index layer. The refractive index of the middle refractive index layer is preferably from 1.50 to 1.70.

[Low Refractive Index Layer]

The low refractive index layer is formed by sequentially laminating on the high refractive index layer. The refractive index of the low refractive index layer is from 1.20 to 1.55. A preferable refractive index thereof is from 1.30 to 1.50. Preferably, the low refractive index layer is formed as the outermost layer having abrasion resistance and protection properties against dirt. As measures to significantly improve abrasion resistance, assignment of slip properties to the surface is effective. Conventionally known measures, such as a thin film layer formed by introduction of silicone, introduction of fluorine, and the like, can be used. The refractive index of a fluorine-containing compound is preferably from 1.35 to 1.50. More preferably, it is from 1.36 to 1.47.

The thickness of the low refractive index layer is preferably from 30 to 200 nm, more preferably from 50 to 150 nm, and most preferably from 60 to 120 nm

[Other Layers of the Antireflection Film]

A hard-coat layer, a forward scattering layer, a primer layer, an antistatic layer, an undercoat, a protective layer, and the like may be further provided.

(Hard-Coat Layer)

The hard-coat layer is provided on the transparent substrate in order to give physical strength to the antireflection film. Particularly preferably, the hard-coat layer is provided between the transparent substrate and the high refractive index layer.

The hard-coat layer is preferably formed by a crosslinking reaction or polymerization reaction of a compound curable by light and/or heat.

As a curable functional group, photopolymerizable functional groups are preferable. As an organometallic compound containing a hydrolytic functional group, organic alkoxysilyl compounds are preferable. Examples of these compounds include the same compounds as those exemplified in the case of the high refractive index layer. A specific configuration composition of the hard-coat layer includes those described in Japanese Patent Application Laid-Open No. 2002-144913 and 2000-9908, and WO 00/46617, for example.

The high refractive index layer can serve also as the hard-coat layer. In such a case, preferably, the hard-coat layer is formed by minutely dispersing particulates obtained by using the method described in the case of the high refractive index layer to contain the particulates in the hard-coat layer. The hard-coat layer can serve also as the anti-glare layer (mentioned later) in which particles having an average particle size of 0.2 to 10 μm is contained and anti-glare function (anti-glare function) is given. The thickness of the hard-coat layer can be appropriately designed according to application. The thickness of the hard-coat layer is preferably 0.2 to 10 μm, and more preferably 0.5 to 7 μm. In the pencil hardness test in accordance with JIS K5400, strength of the hard-coat layer is preferably not less than H, more preferably not less than 2H, and most preferably not less than 3H. Moreover, in a Taber test in accordance with JIS K5400, a smaller amount of wear of a test piece before and after the test is more preferable.

(Forward Scattering Layer)

A forward scattering layer is provided in order to give an effect of improving the viewing angle when a visual angle is inclined in four directions of upward, downward, left, and right directions in application to the liquid crystal display. The forward scattering layer can have also the hard-coat function when particulates having different refractive indexes are dispersed in the above-mentioned hard-coat layer. Examples of the forward scattering layer include: those described in Japanese Patent Application Laid-Open No. 11-38208 where a coefficient of forward scattering is specified; those described in Japanese Patent Application Laid-Open No. 2000-199809 where the relative refractive index of a transparent resin and fine particles are within a specified range; and those described in Japanese Patent Application Laid-Open No. 2002-107512 wherein a haze value of not less than 40% is specified.

(Anti-glare Function)

The antireflection film may have anti-glare function to scatter external light. The anti-glare function is obtained by forming projections and depressions on the surface of the antireflection film. In the case where the antireflection film has the anti-glare function, a haze of the antireflection film is preferably from 3 to 30%, more preferably from 5 to 20%, and most preferably from 7 to 20%. Any method can be used as a method for forming the projections and depressions on the surface of the antireflection film as long as the shape formed on the surface can be held fully. For example, other than the manufacturing method of the multilayer film according to the present invention, examples of such a method include a method for forming projections and depressions on a film surface of the low refractive index layer using particulates (for example, Japanese Patent Application Laid-Open No. 2000-271878); a method for adding a small amount (0.1 to 50% by mass) of relatively large particles (particle size of 0.05 to 2 μm) to form a film having surface unevenness in a lower layer of a low refractive index layer (a high refractive index layer, a middle refractive index layer, or a hard-coat layer), and maintaining these shapes to provide the low refractive index layer on the lower layer (for example, Japanese Patent Application Laid-Open Nos. 2000-281410, 2000-95893, 2001-100004, and 2001-281407); and a method for physically transferring a shape of projections and depressions on the surface after coating a top layer (a protection layer against dirt) (for example, embossing described in Japanese Patent Application Laid-Open Nos. 63-278839, 11-183710, and 2000-275401).

An example in which the present invention is applied to the antireflection film has been mainly described in the present embodiment, but the present invention will not be limited to this. For example, the present invention can be applied also to a manufacturing technique of optical functional film sheets such as anti-glare films, polarizing plates, and optical compensation films, functional films including a heat sensitive developing agent or nano particles, separator films for fuel cells, magnetic recording tapes, adhesive tapes, barrier films, and the like. Any material may be used for the substrate as long as only the solvent for forming the multilayer film penetrates into the substrate.

EXAMPLES

Hereinafter, Examples will be given and characteristics of the present invention will be described more specifically. The scope of the present invention, however, should not be restrictively interpreted by specific examples given below.

Example 1

Using triacetyl cellulose [FUJITAC, made by Fujifilm Corporation] having a width of 1000 mm and a thickness of 80 μm as a transparent substrate, a coating liquid prepared as follows was continuously applied in a coating thickness of approximately 10 μm onto the transparent substrate while a wire bar of #3.2 was rotated in the same direction as the traveling direction of the transparent substrate. Then, the coating liquid was dried at a drying speed of 0.6 g/m$^2$/s at room temperature. After heating for 90 seconds at 60° C., irradiation with ultraviolet rays having an illuminance of 600 mW for 4 seconds was performed. Thus, an antireflection film in which an antireflection layer was formed was produced.

<Composition of the Coating Liquid>

As solute components, an acrylic resin, CAP (cellulose acetate propionate), an acrylic ultraviolet curable compound, and a photopolymerization initiator were mixed in a weight ratio of 10:1.3:10:0.8. The mixed solute components were dissolved in a solvent of methyl ethyl ketone (MEK) to prepare the coating liquid. The solid concentration of this coating liquid was 0.338% by mass. Moreover, a permeation speed of methyl ethyl ketone as the solvent into TAC (the transparent substrate) was measured with a micro Raman measuring apparatus shown in FIG. 3. It was 1.2 g/m$^2$/s.

The cross-sectional structure of the coated layer of the thus-obtained antireflection film was observed with a TEM (transmission electron microscope), and evaluated on the following criteria.

A . . . uniform two-layered structure having inverted sea-islands

B . . . satisfactory level as products although the two-layered structure is partially uneven C . . . monolayer structure in which only sea-islands were formed Table 1 shows this result.

Example 2

An antireflection film was produced in the same way as in Example 1 except that in the above-mentioned coating liquid, the solid concentration was fixed, and a mixed solvent was used, the mixed solvent having the solvent composition of methyl ethyl ketone (MEK):butanol in a mass ratio of 90:10. The cross-sectional structure of the coated layer was observed with the TEM. The permeation speed of the mixed solvent into the TAC (the transparent substrate) was 0.8 g/m$^2$/s. Table 1 shows this result.

Example 3

An antireflection film was produced in the same way as in Example 1 except that the drying speed of the coating liquid was 0.03 g/m$^2$/s. The cross-sectional structure of the coated layer was observed with the TEM. The permeation speed of the mixed solvent into the TAC (the transparent substrate) was 1.2 g/m$^2$/s. Table 1 shows this result.

Example 4

An antireflection film was produced in the same way as in Example 1 except that the drying speed of the coating liquid was 5.0 g/m$^2$/s. The cross-sectional structure of the coated layer was observed with the TEM. The permeation speed of the mixed solvent into the TAC (the transparent substrate) was 1.2 g/m$^2$/s. Table 1 shows this result.

Example 5

An antireflection film was produced in the same way as in Example 1 except that the drying speed of the coating liquid was 6.0 g/m$^2$/s. The cross-sectional structure of the coated layer was observed with the TEM. The permeation speed of the mixed solvent into the TAC (the transparent substrate) was 1.2 g/m$^2$/s. Table 1 shows this result.

Comparative Example 1

An antireflection film was produced in the same way as in Example 1 except that in the above-mentioned coating liquid, the solid concentration was fixed, and a mixed solvent was used, the mixed solvent having the solvent composition of methyl ethyl ketone:butanol in a mass ratio of 80:20. The cross-sectional structure of the coated layer was observed with the TEM. The permeation speed of the mixed solvent into the TAC (the transparent substrate) was 0.4 g/m$^2$/s. Table 1 shows this result.

Comparative Example 2

An antireflection film was produced in the same way as in Example 1 except that in the above-mentioned coating liquid, the solid concentration was fixed, and the solvent composition was changed to tetrahydrofuran (THF). The cross-sectional structure of the coated layer was observed with the TEM. The permeation speed of the mixed solvent into the TAC (the transparent substrate) was 0.3 g/m$^2$/s. Table 1 shows this result.

Comparative Example 3

An antireflection film was produced in the same way as in Example 1 except that the material for the transparent substrate was changed to polyethylene terephthalate (PET). The cross-sectional structure of the coated layer was observed with the TEM.

The permeation speed of the mixed solvent into the PET (the transparent substrate) was 0.03 g/m$^2$/s. Table 1 shows this result.

TABLE 1

| | Kind of solvent | Transparent substrate | Permeation speed (g/m$^2$/s) | Drying speed (g/m$^2$/s) | Layer structure |
|---|---|---|---|---|---|
| Example 1 | MEK | TAC | 1.2 | 0.60 | A |
| Example 2 | MEK 90% Butanol 10% | TAC | 0.8 | 0.60 | A |
| Example 3 | MEK | TAC | 1.2 | 0.03 | A |
| Example 4 | MEK | TAC | 1.2 | 5.00 | A |
| Example 5 | MEK | TAC | 1.2 | 6.00 | B (only small sea-islands) |
| Comparative Example 1 | MEK 80% Butanol 20% | TAC | 0.4 | 0.60 | C (only large sea-islands) |
| Comparative | THF | TAC | 0.3 | 0.60 | C (only large sea-islands) |

TABLE 1-continued

| | Kind of solvent | Transparent substrate | Permeation speed (g/m²/s) | Drying speed (g/m²/s) | Layer structure |
|---|---|---|---|---|---|
| Example 2 Comparative Example 3 | MEK | PET | 0.03 | 0.60 | C (only large sea-islands) |

Examples 1 to 5 are the cases where the permeation speed of the solvent into the transparent substrate satisfies (drying speed of solvent)/(permeation speed of solvent into transparent substrate)>1. Comparative Examples 1 to 3 are the cases where the permeation speed is (drying speed of solvent)/(permeation speed of solvent into transparent substrate)<1. As shown in Table 1, in each of Examples 1 to 5, the two-layered structure in which two kinds of the polymers were inverted was formed. On the other hand, in each of Comparative Examples 1 to 3, only sea-islands were formed and the two-layered structure was not obtained. Particularly, it turns out that in Examples 1 to 4 at a drying speed of 0.03 to 5.0 g/m²/s, the two-layered structure is stably formed without defects such as deformation of the transparent substrate.

Example 6

Figure 6:
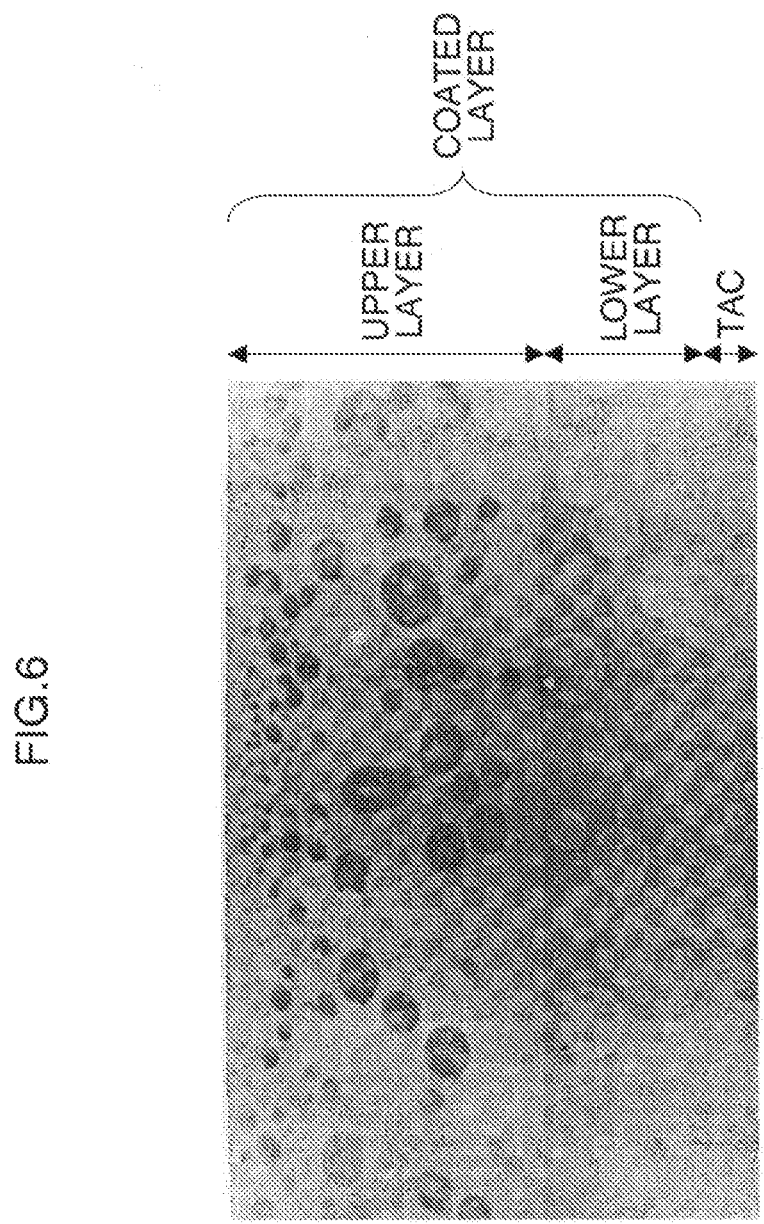
FIG. 6 is a photographic drawing showing a result in the present Example.

An antireflection film was produced in the same way as in Example 1 except that in Example 1, the drying speed was controlled precisely so that an upper layer and a lower layer separated during drying might cross the critical point as shown in FIG. 2. FIG. 6 shows the result of observation of the cross-sectional structure of the coated layer with the TEM.

As shown in FIG. 6, it turned out that a uniform sea-island structure in which the composition ratio of the upper layer is different from that of the lower layer is obtained by controlling the drying speed so that the upper layer and the lower layer may cross the critical point as shown in FIG. 2.

The invention claimed is:

1. A manufacturing method of a multilayer film, comprising the steps of:
    applying a single layer of a coating liquid onto a substrate, the coating liquid being prepared by dissolving a plurality of monomers and/or polymers, including at least two monomers and/or polymers which are not soluble with each other, in at least one solvent; and
    drying the coated layer;
    wherein at the step of drying the coated layer, the coated layer is separated into an upper layer and a lower layer each having a different composition by allowing the at least one solvent to penetrate into the substrate at a specified speed.

2. The manufacturing method of a multilayer film according to claim 1, wherein (drying speed of the solvent)/(penetration speed of the solvent into the substrate) >1 at the step of drying.

3. The manufacturing method of a multilayer film according to claim 1, wherein the drying speed of the solvent is from 0.03 to 5 g/m²/s.

4. The manufacturing method of a multilayer film according to claim 1, wherein the coating liquid contains another solvent whose penetration speed into the substrate is not more than ½ of that of the solvent.

5. The manufacturing method of a multilayer film according to claim 1, wherein a ratio of the drying speed to the penetration speed is adjusted so that a composition ratio in the upper layer and a composition ratio in the lower layer, the upper layer and the lower layer being phase-separated from a drying start point of the coating layer, split into the first polymer side and the second polymer side with respect to a critical point at which a binodal line and a spinodal line coincide on a triangular phase diagram to respectively change concentrations in the upper layer and the lower layer respectively, wherein the triangular phase diagram has the solvent, the first polymer, and the second polymer as three apexes.

* * * * *